(12) United States Patent
McMillan et al.

(10) Patent No.: US 7,329,102 B2
(45) Date of Patent: Feb. 12, 2008

(54) BLADE

(75) Inventors: Alison J. McMillan, Uttoxeter (GB); Simon Read, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/252,718

(22) Filed: Oct. 19, 2005

(65) Prior Publication Data

US 2006/0104818 A1     May 18, 2006

(30) Foreign Application Priority Data

Nov. 13, 2004   (GB)  ................................. 0425137.7

(51) Int. Cl.
  *F01D 5/16*   (2006.01)
  *F01D 5/14*   (2006.01)

(52) U.S. Cl. .................. 416/229 A; 416/230; 416/232; 416/500

(58) Field of Classification Search ............ 416/229 A, 416/230, 232, 233, 241 A, 500
See application file for complete search history.

(56) References Cited

U.S. PATENT DOCUMENTS

| | | | |
|---|---|---|---|
| 2,458,975 A * | 1/1949 | Brady | 416/232 |
| 4,815,939 A * | 3/1989 | Doble | 416/233 |
| 4,859,141 A | 8/1989 | Maisch | |
| 5,584,660 A * | 12/1996 | Carter et al. | 416/233 |
| 6,048,174 A * | 4/2000 | Samit et al. | 416/233 |
| 6,669,447 B2 * | 12/2003 | Norris et al. | 416/224 |
| 7,025,568 B2 * | 4/2006 | Jones | 416/90 R |
| 2004/0151585 A1 | 8/2004 | Jones | |

FOREIGN PATENT DOCUMENTS

| | | |
|---|---|---|
| EP | 0 926 312 A | 6/1999 |
| EP | 1 120 177 A | 8/2001 |
| GB | 0 677 274 | 8/1952 |
| GB | 0 811 454 | 4/1959 |
| GB | 1 078 098 | 8/1967 |
| GB | 1 144 036 | 3/1969 |
| GB | 1 366 704 | 9/1974 |
| GB | 2 210 415 A | 6/1989 |
| GB | 2 343 486 A | 5/2000 |
| WO | WO 02/42638 A | 5/2002 |

* cited by examiner

*Primary Examiner*—Edward K. Look
*Assistant Examiner*—Nathan Wiehe
(74) *Attorney, Agent, or Firm*—W. Warren Taltavull; Manelli Denison & Selter PLLC

(57) ABSTRACT

With regard to hollow blades for turbine engines, it will be understood there is a problem with respect to percussive impact resulting in excessive distortion of the blade as well as potential failure as a result of blade tip bulging. By provision of ridges 107, 207, 307 which coincide and engage each other under impact, the extent of impact deformation is limited as well as a result of the narrowing between the ridges, a reduction in the possibility for fragmentary insert movement to bulge the cavity towards the tip 102, 202, 302 of a blade 100, 200, 300.

16 Claims, 2 Drawing Sheets

BLADE

FIELD OF THE INVENTION

The present invention relates to blades and more particularly to fan blades utilised within a gas turbine engine.

BACKGROUND OF THE INVENTION

Referring to FIG. 1, providing an example of a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow in the example shown into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 in the example shown before being exhausted through the nozzle 19 to provide additional propulsive thrust. It will be understood some engines do not have an intermediate compressor or intermediate turbine. The high, intermediate and low pressure turbines 16, 17 and 18 respectively drive the high and intermediate pressure compressors 14 and 13 and the fan 12 by suitable interconnecting shafts.

Because the bypass ratio is high it will be appreciated that the total size of the fan blades utilised is high with respect to the compressor and turbine stages of a gas turbine engine. The number of blades will be in the order of twenty while there will be significantly more compressor or turbine blades. Traditionally, these blades were solid formed of a relatively lightweight metal for structural strength. More recently, hollow blades or blades filled with an appropriate viscous material have been specified and used. It will be appreciated that by providing a hollow or blade filled with a lighter weight material the ongoing objective of reducing engine weight is achieved. Nevertheless, such blades are susceptible to damage as a result of percussive impacts and operational ageing. There may also be problems with respect to localised plastic deformation of the blade which may cause flutter upon blade rotation. It will be appreciated that these problems persist whether the infill is a simple viscous material or a composite material. In view of the above ideally a blade should be lightweight for aircraft applications, whilst providing necessary structural strength and characteristics for blade operation and resistance to impact energies beyond acceptable levels.

SUMMARY OF THE INVENTION

In accordance with the present invention there is provided a blade defining a hollow profile with an internal cavity comprising two opposed surfaces, the internal cavity being filled with an insert, at least one opposed surface having ridges extending inwardly towards the other opposed surface to direct shock waves from an impact into the insert within the cavity.

Typically, both opposed surfaces have ridges. Possibly, the ridges in opposed surfaces are in near contact with each other. Typically, ridges in opposed surfaces coincide with each other. Typically, the ridges are arranged in a pattern which is symmetrical about a plane between the opposed surfaces. Alternatively, the ridges may be staggered relative to each other on the opposed surfaces.

Generally, the ridges are rounded. Alternatively, the ridges are pointed. Possibly, the ridges are straight and arranged in a radial pattern across the blade and/or in a longitudinal pattern along the blade from its root to its tip. Alternatively, the ribs are curved for consistency with an aerofoil profile of the blade. Possibly, the ribs are arranged in a herringbone pattern.

Possibly, the ribs are laterally displaceable upon or relative to its opposed surface. Possibly, two or more ridges in opposed surfaces are displaceable but associated with each other.

Possibly, each ridge has a symmetrical cross-section. Alternatively, each ridge has a ramped cross-section to define a wedge shape. The wedge can be straight, convex or concave.

Possibly, the insert is for vibration or percussive shock resistance. Generally, the ridges prevent movement of a fractured or fluid insert material particularly as a result of centrifugal loading as a blade is rotated. Possibly, the ridges are arranged whereby shock waves propagating through the blade are arrested by the ridges and released by an end of the ridge into a viscous material in the internal cavity.

Also in accordance with the present invention there is provided a gas turbine engine incorporating a blade as described above.

BRIEF DESCRIPTION OF THE DRAWINGS

Embodiments of the present invention will now be described by way of example and with reference to the accompanying drawings in which:—

DETAILED DESCRIPTION OF THE INVENTION

As indicated above, it is known to provide blades which incorporate a hollow cavity in order to reduce weight. It is also known to fill that cavity with a viscous or composite material in order to provide fatigue and vibration resistance for the blade. Nevertheless, having a hollow cavity renders the blade susceptible to distortion and failure upon impact. With respect to the compressor fan stages of a turbine engine it would be understood that these impacts are referred to as "bird strikes" and foreign object damage (FOD). In principal, the problem is that the cavities containing the viscous or composite material infill are relatively open such that the difference in behaviour between a metallic surface of the blade and a softer infill lead to unacceptable collapse and failure. Ideally, an adequate stiffness should be provided for the blade without excessive use of metal thickness in the blade surface to provide such stiffness. With hollow blades upon impact the relatively thin metal surface to the blade collapses over a relatively wide area due to the unrestrained fluidic flow of the softer infill material, whether in the elastomeric sense or due to fragmentation of the insert. Ideally what is required is some means of regularising cohesion between the metal surface layer and the underlying composite or viscous material infill whereby impact wave deformation is resisted such that the eventual impact site area is increased. It will be understood that the same impulse over a larger incidence area results in lower overall stresses.

Figure 1:
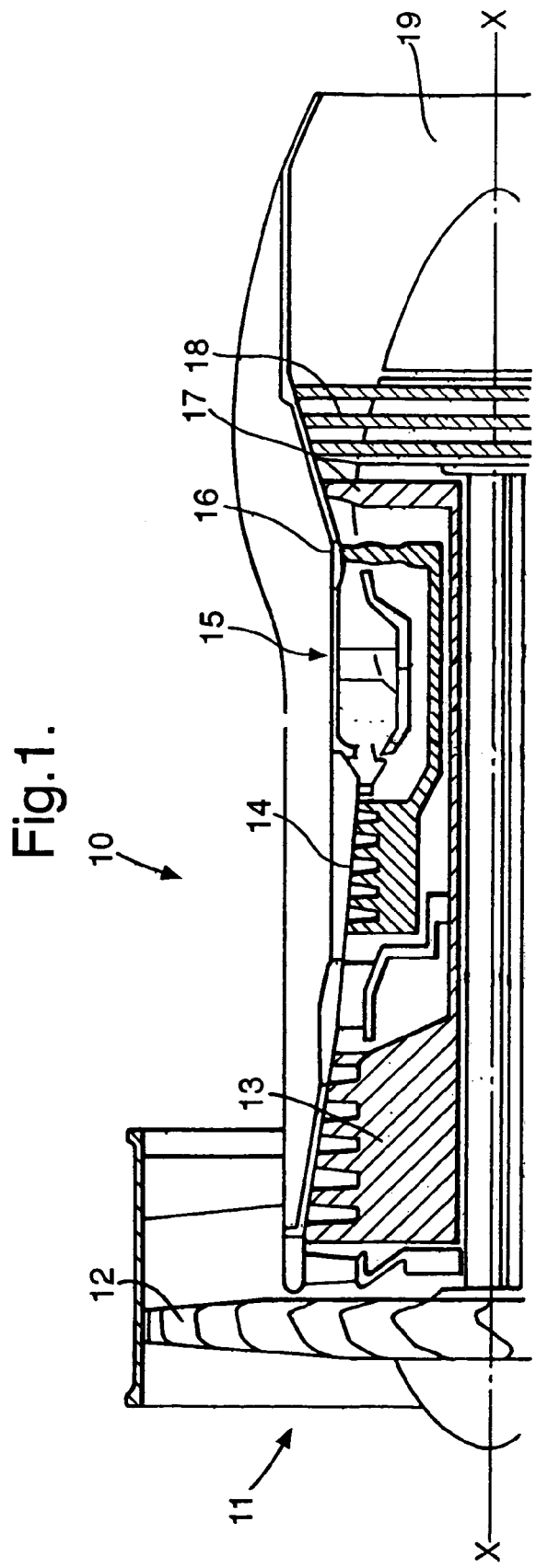
FIG. 1 is a schematic sectional side view of the upper half of a gas turbine engine.
Figure 2:
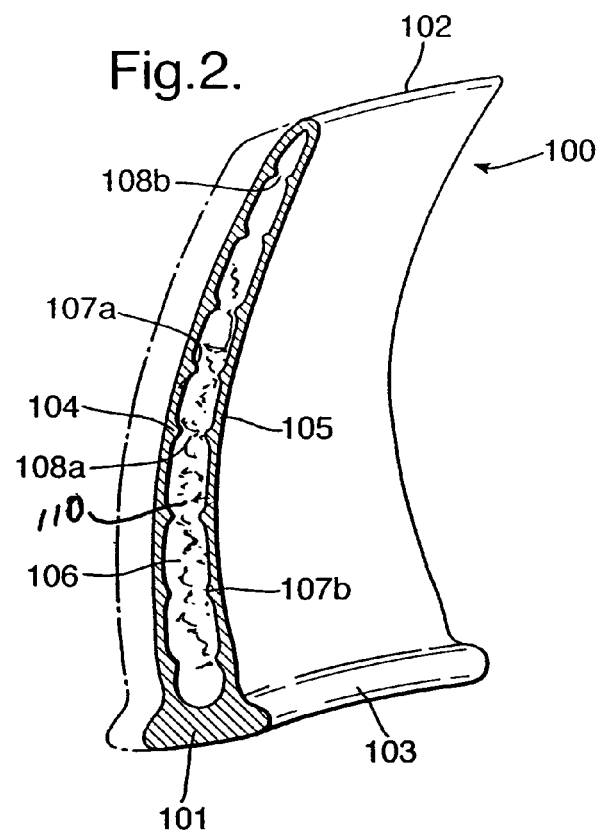
FIG. 2 is a schematic front perspective view of a part cross-section of a blade.

Referring to FIG. 2 illustrating a schematic front part cross-section of a blade 100 in accordance with the present invention. The blade 100 will be incorporated as a fan blade or a compressor blade within a fan stage or compressor stage of a gas turbine engine as described previously with respect of FIG. 1. The fan blade comprises an aerofoil profile between a root section 101 and a tip section 102. The root section 101 will generally be of a bulbous cross-section 103 such that it can be secured into a rotor disc in order to form a fan or compressor stage as described previously. Between opposed wall surfaces 104, 105 which define the aerofoil of the blade 100, a cavity 106 may be left empty or is filled with an insert filler material 110. This filler material or insert 110 is of conventional form and may be a viscous material, a soft polymeric material or a composite material comprising a polymeric material and glass or other fibre reinforcement.

In accordance with the present invention the opposed inner wall surfaces 104, 105 incorporate ridges 107a and 107b respectively in a pattern specific and defined by necessary blade 100 operation. These ridges 107a and 107b are typically parallel to the rotor or engine axis when the blade 100 is installed within a gas turbine engine (see FIG. 1). However, it will be appreciated that the ridges 107a and 107b could also be presented at any angle in order to provide their function as described below. Furthermore, the ridges 107a, 107b will be defined to extend across the full width of the blade 100 or incorporate breaks as required.

The purpose of the ridges 107a, 107b or ribs is generally two-fold. Firstly, the ridges 107a, 107b act to limit physical deformation depth for the blade 100 under impact. In such circumstances the ridges 107a, 107b coincide and oppose each other such that upon impact the ridges will abut each other to prevent further deformation. Typically, as depicted ridges 107a, 107b or ribs are provided in both surfaces 104, 105, but it will be understood that it is possible to provide ridges or ribs in only one surface with the other surface substantially smooth in a curved or flat configuration.

As indicated, the ridges 107a, 107b in the surfaces 104, 105 are generally arranged so that the apex of each ridge 107a on the surface 104 coincides with that of a respective ridge 107b on the opposed surface 105. In such circumstances, the ridge 107a, 107b pattern in each surface 104, 105 will be symmetrical about the arc of the blade 100 extending from the tip section 102 to the root section 101 between the opposed surfaces 104, 105. A second function of the ridges 107a, 107b is to resist movement of the insert 110 within the cavity 106 formed between the surfaces 104, 105 under impact. It will be appreciated that the effect of the ridges 107a, 107b is to create a constriction or necking between the ridges 107a, 107b which resists lateral and other internal flows of the insert 110 material under impact. This resistance provides vibration resistance as well as means to limit site of impact buckling by enhancing the resilient strength of the insert 110 material. Again, the ridges 107a, 107b will be chosen in order to gain required benefits with respect to resistance of the insert 110 under impact.

It will be appreciated that centrifugal forces will act upon the insert 110 tending to force outward movement of the insert 110 towards the tip section 102 unless restrained. In such circumstances as can be seen, the ridges 107a, 107b towards that tip section 102 are arranged that the space 108a between the ridges 107a, 107b is relatively greater towards the root section 101 end of the blade 100 compared to the space 108b between the ridge 107a, 107b towards the tip section 102.

Generally, the ridges 107a, 107b will have a well rounded apex to facilitate a relatively wide engagement band when the coincident ridges 107 contact each other under impact to resist impact deformation. Alternatively the ridges 107a, 107b could have a more angular and sharp apex if required in order to more acutely define gaps 108a, 108b or provide more axial engagement with its opposed ridge 107a, 107b. In such circumstances the ridges 107a and one opposed surface 104 may be more angular or sharp with respect to their apex in comparison with the ridges 107b on the other opposed surface 105 or vice versa. This would be especially so if the ridges are not aligned with each other.

It will be appreciated that the function of ridges 107a, 107b coming into contact or approaching contact and constraint to movement with respect to the insert 110 are relatively complimentary. As indicated, ridge 107a to ridge 107b contact will act to limit deformation range under impact whilst narrowing of the gap 108a, 108b will itself inhibit movement of the insert 110 and therefore act as a constraint which should increase the impact absorption effect of the insert 110.

It will be appreciated that the wedges or ridges should be arranged such that the cross section of the wedge or ridge towards its apex is significantly less than the cross section towards the base of that wedge or ridge. Thickness will generally reduce lineally and parasitically, etc, i.e. a concave curvature on both sides leading to a spike at one end or with a rounded off spike at the apex of the wedge or ridge.

Figure 3:
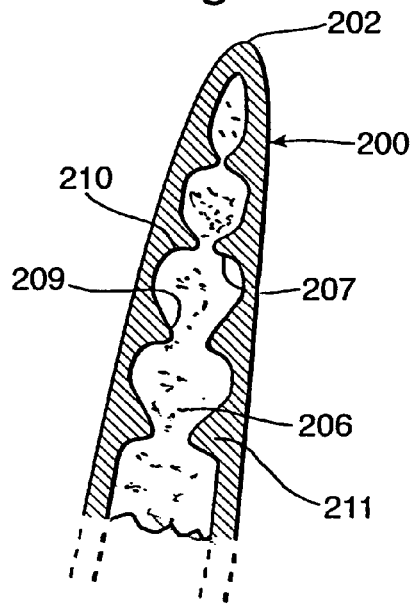
FIG. 3 is a schematic part cross-section of an alternative blade in accordance with the present invention; and, FIG. 4 is a schematic part cross-section of a blade in accordance with the present invention illustrating impact deformation upon that blade.

Generally, for ease of manufacture, the ridges 107 will be of a relatively symmetrical nature with as indicated, either a sharp angular apex or smoother rounded apex dependent upon requirements. There may be a finite angle between slopes either side of the apex or the apex bend towards zero degrees. Alternatively, the ridges could be arranged to form a wedge shape. Such a wedge shape is illustrated in FIG. 3 as a schematic part cross-section of a blade 200. Thus, ridges 207 have a ramp or askew nature with an apex 209 positioned such that there is an acute slope 210 on one side and a ramp or more gradual slope 211 on the other. The actual apex 209 may be flat or curved and as described previously these apexes 209 will generally come into contact or come close to contact during an impact event. Under such circumstances as depicted in FIG. 3, the acute slope side 210 is presented to face the direction of most likely insert 206 deformation movement under impact, that is to say towards the tip 202. In such circumstances, movement is further constricted.

Figure 4:
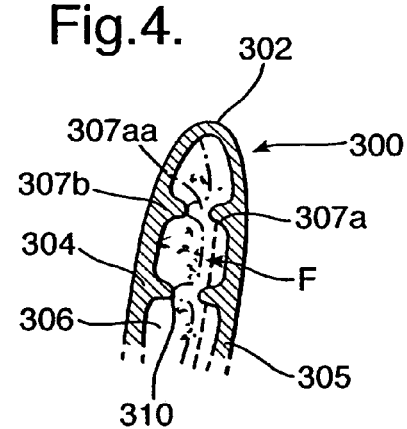

FIG. 4 illustrates a schematic and part cross-section deformation effects with respect to a blade 300. Thus, an impact force F in the direction of the arrowhead acts to displace a wall surface 305 from its initial position (solid line) to a deformed position (dotted line). An insert 306 is held within the cavity between the deformed wall surface 305 and its opposed surface 304. In such circumstances, ridges 307a, 307b are brought into physical contact at a position 310 whereby further ready displacement is prevented. Furthermore, by action of the pinching or narrowing of the gap between the ridges 307a and 307b, it will be understood that the insert 306 is also inhibited with respect to its movement under such impact load force F. It will be noted that ridge 307a is displaced under the load force F to position 307aa such that the gap between that displaced ridge 307a and its opposing ridge 307b is eliminated or greatly reduced.

In such circumstances the relatively soft insert material 306 is trapped between the ridge structures 307. This trapping prevents movement and holds the insert 306 in place under impact loading. After impact such as when the insert material breaks up the fluidic movement of such fragments is prevented by the pinching effect between the opposed ridges 307a and 307b, particularly at the tip section 302 of the blade 300. It will be appreciated with previous arrangements without the movement constraining ridges 307 of the present invention that such fragmented, or if fluid, insert material will be forced towards the tip section 302 and therefore create an internal bulging force which may rupture the blade 300 at high rotational speeds, cause de-stabilising rotational flutter or at least cause out-of-balance to a blade set, adding significantly to the bearing loads, spoiling blade tip clearances and generally reducing engine efficiency.

By careful choice of the ridge angles in particular with respect to a wedge ridge 207, it is possible to effectively disperse the shock wave propagation of the impact load initially through the metal wall surfaces and then the softer insert can accommodate shock impact more effectively.

Finally, in comparison with smooth internal surfaced cavities for blades in prior arrangements, it will be understood that the ridges of the present invention act as reinforcing ribs improving blade torsional stiffness. Blade flap stiffness is governed by the relatively solid material at the leading and trailing edges of the blade.

In terms of manufacture, blades in accordance with the present invention will be formed by known processes. Material for the blade could be machined to shape on the external surfaces and then under-forming create bulges on the internal surfaces of the walls. In such circumstances, typical sharp curvatures with respect to the ridges will be avoided and the insert created by forcing a settable filler into the cavity from an inlet. This insert may remain fluidic, but as indicated such a fluidic nature will create movements under centrifugal forces. The present invention holds the insert in place by provision of converging internal ridge surfaces created at the apex of each ridge. Such converging internal surfaces tend to prevent clumping of filler when broken up by an impact load. It will be appreciated that if the insert is rendered solid after insertion, the impact load may fracture this fragile solid insert into a number of aggregate components which can then move under centrifugal force towards the tip causing flutter, bulging and potential failure.

By inclusion of the ridges in accordance with the present invention, it will be appreciated that thinner section metal surfaces can be used reducing weight with the reassurance that the blade profile created by those surfaces with the cavity therebetween is sufficient to provide blade function, but insert movement is generally restrained by engagement with the ridges and then subsequent to impact convergence of the ridges prevents movement of the insert towards the tip causing bulging failure.

As indicated above, choice of ridge angle between the opposed surfaces of the blade controls the reflection fraction of impact shockwaves through the blade. In such circumstances these impact shockwaves engage the insert material at a less oblique angle with resultant lower delamination forces and better insert material operational performance.

The present invention therefore provides a hollow blade with an internal cavity defined by two opposed surfaces, the internal cavity containing an insert, at least one of the opposed surfaces having ridges extending inwardly towards the other opposed surface.

The ridges direct the shock waves/vibrations from an impact on the blade into the insert, or filler, material in directions which are less damaging than the shock waves/vibrations from an impact which pass straight through the thickness of the wall of the blade. It is believed that shock waves passing straight through the walls of the blade cause delamination of the insert, or filler, material from the inner surfaces of the walls of the blade. Whereas it is believed that the ridges direct the shock waves in directions so as to reduce the possibility of delamination of the insert, or filler, material from the inner surfaces of the walls of the blade. The shock wave, or shock energy, is directed into the ridges and is then directed into the insert, filler, material where the shock wave, shock energy, is absorbed. It is believed ridges increase the average path length for the shock waves to pass through the walls of the blade and also increase the amount of damping achieved. The directing of the shock wave, shock energy, into the insert, or filler, material may be of two kinds. The directing of the shock wave, shock, energy, into the ridges may make the shock wave, shock energy, radiate from the apexes of the symmetrical ridges, such that the shock wave, shock energy, is directed in all directions into the insert, or filler, material. The positioning of the apexes to one side of the ridges and the directing of the shock wave, shock energy, into the ridges may make the shock wave, shock energy, be ejected primarily to that side, or in that direction, although there would be a given amount of radiation from the apexes in all directions. In either instance, the net effect is that less shock wave, shock energy, passes straight through the walls of the blade and the average path length is significantly longer.

The wedge angle of the ridges may be varied to suit the application. There may be a large number of ridges with steep wedge angles or a smaller number of ridges with shallow wedge angles. Preferably the wedge angle is greater than 40°, such that reflections are inwards rather than outwards. The wedge angle may become more shallow towards the apex of the ridges.

It will also be understood that under extreme operational loading the ridges may be designed themselves to flex into a pinching engagement so that load is transmitted directly from one side of the blade to the other through the engaging ridge apex surfaces.

It will be understood that within the blade between the ridges the surfaces are relatively weak. In such circumstances under high loads these sections between the ridges may buckle or crumble. This may be utilised to limiting transfer loads from the blade into a containment casing about a blade assembly of a turbine engine.

The ridges in accordance with the present invention as indicated will generally run across the width of a blade. However, it will be appreciated that these ridges may be straight or curved and may also run radially as well as longitudinally within the internal cavity between the opposed surfaces. The ridges may also take specific shaping of the configuration for best effect with respect to resisting insert movement and also providing coinciding engagement under severe impact load. Thus, the ridges may have a herringbone or waved or other ridge pattern for best effect with respect to insert movement and/or ridge apex to ridge apex engagement under impact load.

Generally, ridges in accordance with the present invention will be machined or otherwise formed in the internal cavity between the opposed surfaces of the blade. However, alternatively ridges may be associated with the opposed surfaces but allowed to become laterally displaced upon their respective opposed surface in order to provide percussive impact wave damping. In such circumstances the ridges may be allowed to move within an anchor or tether slot to a certain extent in order to provide damping but nevertheless will remain in positions for coincidence with ridges in the opposed surface. In such circumstances guides or other devices may be provided to co-ordinate movements of the ridges both collectively within one opposed surface and with their coincident ridge in the other opposed surface. Collective movement with respect to ridges associated with one opposed surface may be through simple tether associations. Association with an opposed coincidence ridge may be through relatively rigid ladder strings between these opposed ridges causing collective movement of both ridges and guiding one ridge as to the other under impact.

Alterations and modifications to the present invention will be envisaged by persons skilled in the art. Thus, for example, adaptation of the apex surfaces of the respective ridges may be such that there is an interlock engagement under impact further reducing the possibility of fragmented insert movement bulging a blade tip under centrifugal load. Furthermore, ridges may be made from relatively soft or harder material in order to create more robust narrowing of the gap between the ridges and therefore resistance to insert or fragmented movements. Additionally, there may be a fillet curve between the ridge or wedge at its base junction with the remainder of the blade cavity.

The present invention is also applicable to other blades in a gas turbine engine, which may suffer from impacts from foreign objects for example compressor blades, compressor vanes and fan outlet guide vanes. The present invention is also applicable to other blades, which may suffer from impacts from foreign objects for example ship propeller blades, aircraft propeller blades, helicopter blades, winder turbine blades, etc.

We claim:

1. A blade defining a hollow profile with an internal cavity comprising two opposed surfaces, the internal cavity being filled with an insert filler material, at least one opposed surface having ridges, said ridges having ends out of contact and spaced from the opposing surface, said ridges being wedge shaped in cross-section and extending inwardly towards the other opposed surface to direct shock waves from an impact into the insert filler material within the cavity.

2. A blade as claimed in claim 1 wherein both opposed surfaces have ridges.

3. A blade as claimed in claim 2 wherein the ridges in opposed surfaces are arranged such that upon impact said ridges abut each other to prevent further deformation.

4. A blade as claimed in claim 2 wherein ridges in opposed surfaces coincide with each other.

5. A blade as claimed in claim 2 wherein the ridges are arranged in a pattern which is symmetrical about an arc of the blade extending from a tip to a root between the opposed surfaces.

6. A blade as claimed in claim 2 wherein the ridges are not aligned in opposed surfaces.

7. A blade as claimed in claim 1 wherein the ridges are rounded.

8. A blade as claimed in claim 1 wherein the ridges are pointed with a finite angle between surfaces either side of the ridge.

9. A blade as claimed in claim 1 wherein the ridges are straight and arranged in a radial pattern across the blade and/or in a longitudinal pattern along the blade from its root to its tip.

10. A blade as claimed in claim 1 wherein the ridges are curved for consistency with an aerofoil profile of the blade.

11. A blade as claimed in claim 1 wherein each ridge has a symmetrical cross-section.

12. A blade as claimed in claim 1 wherein each ridge has an asymmetrical cross-section.

13. A blade as claimed in claim 1 wherein the wedge shape cross-section has an increasing taper towards its base.

14. A blade as claimed in claim 1 wherein the wedge shape cross-section has a fillet curve at its base junction with the remainder of the blade.

15. A blade as claimed in claim 1 wherein the insert filler material is for damping of vibration or percussive shock resistance, the insert is selected from the group comprising a viscous material, a soft polymeric material and a composite material.

16. A gas turbine engine incorporating a blade as claimed in claim 1.

* * * * *